Oct. 13, 1931. W. J. OBIDINE 1,827,256
SAFETY DEVICE FOR EMERGENCY BRAKES
Filed July 15, 1929     2 Sheets-Sheet 1
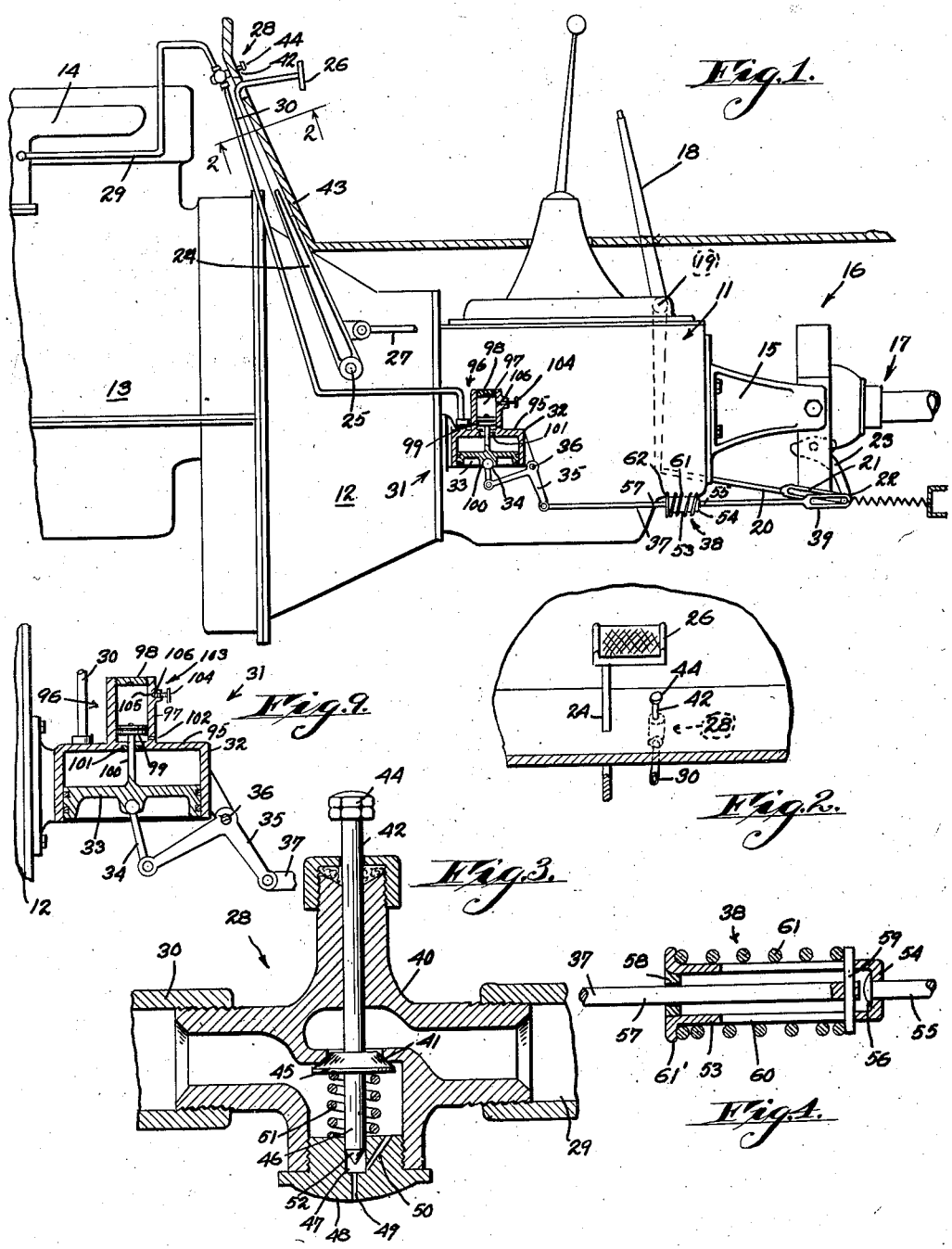
Inventor
Wladimire J. Obidine
by Hazard and Miller
Attorneys Oct. 13, 1931.  W. J. OBIDINE  1,827,256
SAFETY DEVICE FOR EMERGENCY BRAKES
Filed July 15, 1929    2 Sheets-Sheet 2
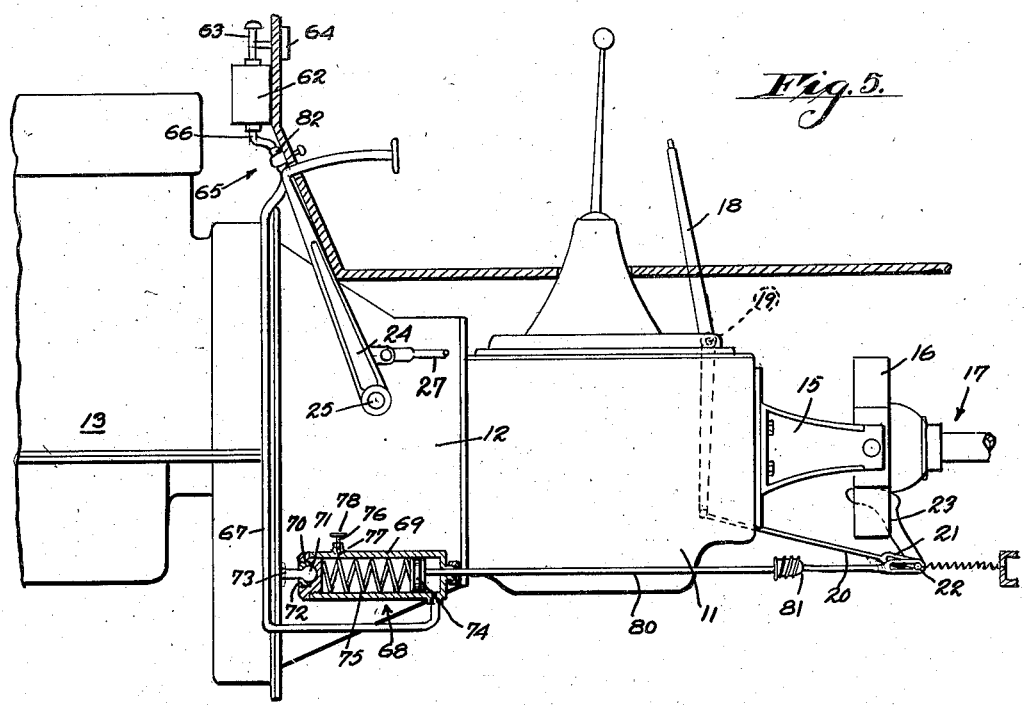
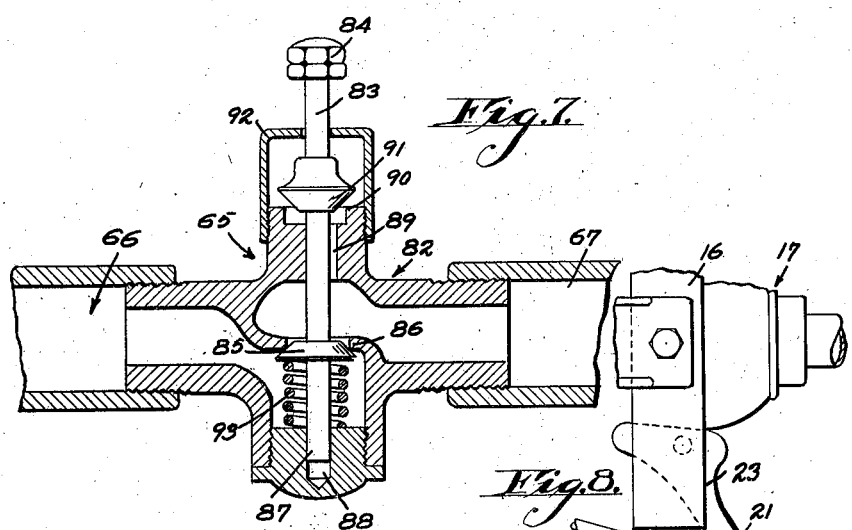
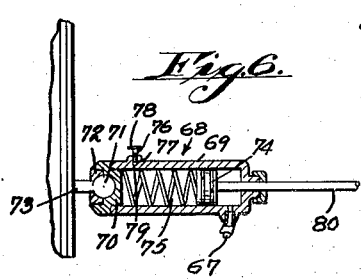
Inventor
Wladimire J. Obidine
by Hazard Miller
Attorneys Patented Oct. 13, 1931

1,827,256

UNITED STATES PATENT OFFICE

WLADIMIRE J. OBIDINE, OF LOS ANGELES, CALIFORNIA

SAFETY DEVICE FOR EMERGENCY BRAKES

Application filed July 15, 1929. Serial No. 378,549.

My invention pertains to a safety device for the emergency braking of motor vehicles, in which if the ordinary service brakes are inoperative, then the emergency or so-called parking brake may be immediately utilized.

An object of my invention is a construction by which should the service or usually the foot pedal brakes of a motor vehicle become inoperative for any reason, that the operator can immediately apply the emergency or so-called parking brake without any additional action than that required in operating the service brakes.

A further object of my invention is a con15 nection to the emergency or parking brakes, whereby these may be applied by the action of the lever operating the service brakes should the service brakes for any reason fail to function, and thus the continued movement of the service brake lever brings into operation the emergency or parking brakes.

Another object of my invention is to effect the operation of the emergency or parking brakes through the control of the service brake pedal, without interfering in any manner with the manual operation of the emergency brakes by the usual hand lever.

A more detailed object of my invention is utilizing the brake pedal lever which con30 trols the service brakes, to control the application of power to the emergency or parking brakes, by a portion of this lever operating the control mechanism when it is depressed beyond the usual limit of operation of the service brakes, should such latter brakes be inoperative, and this may be done by a foot rest of the pedal operating the control for the emergency brakes.

In this connection a still further object of my invention is to have the control device with one of its elements extending above the floor boards of the vehicle and adjacent the treadle of the foot pedal so that this treadle engages the control element when depressed beyond the movement required to apply the service brakes and also in which the control element may be operated by the foot directly if desired, so that the driver may test the power control for the emergency brakes whenever he so desires.

A further object of my invention is utilizing a fluid such as air, as the power medium, to apply the emergency or parking brakes and in which the foot pedal controls a valve governing the flow of air and this valve as above mentioned may have one of its elements such as the valve stem, operated by the treadle of the foot pedal or by the floor pedal direct, by such stem projecting through the floor boards of the vehicle.

In this connection a more detailed object of my invention is utilizing a vacuum system to apply the emergency brakes, in which the suction created in the intake manifold may operate a piston and a piston being utilized to apply the emergency brakes. The control of the vacuum is by means of a valve with the valve stem projecting through the floor boards of the car in a position to engage the foot treadle. Another modification is the use of compressed air held in a suitable storage tank, which after being controlled by a valve influenced by the foot treadle or by the foot, actuates a piston in a cylinder and causes the application of the emergency brakes.

To effect the operation of the emergency brakes, either by the emergency control mechanism or by the hand lever, I have a loose connection such as a pin and slot connection between the two control mechanisms and the emergency brake construction, so that either one or both may be utilized.

My invention is illustrated in the accompanying drawings, in which:

Figure 1 is a side elevation partly in section, of a portion of a vehicle illustrating a vacuum type of control;

Fig. 2 is a section on the line 2—2 of Fig. 1, in the direction of the arrows;

Fig. 3 is a longitudinal section of a suitable type of vacuum control valve;

Fig. 4 is a longitudinal sectional detail of a resilient connection in the operating link leading to the emergency brake;

Fig. 5 is a view similar to Fig. 1, showing a compressed air operation;

Fig. 6 is a detail view of a cylinder and cylinder mounting for the compressed air control;

Fig. 7 is a longitudinal section through a valve suitable for use with compressed air;

Fig. 8 is an enlarged detail showing the dual connection of the emergency brake link and the emergency link to the emergency or parking brake.

Fig. 9 is an enlarged section on the vacuum cylinder power plant shown in Fig. 1.

Referring first to the vacuum system of control, for convenience of illustration this shows a part of the transmission and engine mounting of a vehicle, in which the emergency or parking brakes are applied to the propeller shaft leading to the rear wheels, but it is to be understood that a connection may be made to any type of emergency parking connection.

In the drawings a transmission case is designated by the numeral 11, a clutch case 12, an engine block 13 having an intake manifold 14. A bracket 15 extends rearwardly from the transmission housing and has the emergency or parking brake 16 mounted at the end of the bracket, the propeller shaft housing 17 extending rearwardly from the brakes to the rear wheels of the vehicle. The emergency brakes normally are controlled by the hand lever 18 illustrated as pivoted at 19 and having a link 20 with a slot 21 therein. This slot engages a pin 22 on a lever 23 applying the emergency brakes. By this construction, when the lever 18 is operated it applies the emergency or parking brakes in the normal manner.

Only part of the service brake mechanism is illustrated, such part being the foot operated lever 24 illustrated as pivoted at 25 and having a foot treadle 26. A link 27 connected to the foot lever, extends to any suitable service brake equipment. It is to be understood in this connection that my invention is applicable to any type of service brake, so long as there is a moving lever or pedal forming the control element.

My emergency system has a valve assembly 28, a vacuum pipe 29 connected between the valve and the intake manifold, a second pipe 30 leading to a vacuum power plant assembly 31, this latter having a cylinder 32 indicated as secured to the transmission or clutch case and having a piston 33 therein. This piston has a piston rod 34 and operates a bell crank 35 pivoted on a fixed bracket 36. A link 37 preferably having a resilient section 38 leads to the pin 22, this link having a slot 39 engaging such pin.

The construction of the valve 28 in detail utilizes a valve casing 40 having a seat 41, a stem 42 which projects above the floor boards 43 and has a head or abutment 44 above the floor boards. This head is positioned so that it is engaged by the treadle 26, should the foot pedal be depressed near the floor. In the ordinary operation of the vehicle, when the service brakes are operated properly, the treadle will not be depressed to the floor and hence will not engage the valve stem, but should these brakes be inoperative through breakage of various elements, or any other manner which allows depression to the floor of the treadle, the treadle will engage the valve stem 42 without the operator having to move a foot off the treadle.

The valve stem has a valve plug 45 bearing against the seat. The stem also has an extension 46 operating in a socket 47 in a closure plug 48 in the bottom of the valve. There is an air duct 49 leading from the bottom of the socket 27 to the atmosphere and a second duct 50 leading from the socket into the body of the valve on the side of the plug connecting by the pipe 30 to the vacuum cylinder 32. A compression spring 51 normally tends to hold the valve closed with a connection to atmosphere.

It will be noted that the valve stem has a needle point 52 adapted to close the air duct 49 when the valve is fully opened, to influence the cylinder 32 from the source of vacuum. In order to prevent too quick or too forcible an application of the brakes, I utilize a resilient connection 38 in the link 37. This utilizes a sleeve 53 which has a closed end 54 connected to one section 55 of the link 37, there being an abutment head 56 forming a connection. Another portion 57 of the link 37 passes through a closure plug 58 in the end of the sleeve 35 and engages a pin 59 which is slidable in a longitudinal slot 60 in the sleeve 53. A compression spring 61 bears against the abutment 61' of the sleeve 53 and the pin. Therefore when there is a tension placed on the link 37, it compresses the spring 61 and allows a resilient action in the application of the pull by the slotted portion 39 of the link and the pin 22 of the emergency brake.

The application of my device so far described is as follows: As above mentioned, the hand lever 18 may be manipulated to apply the emergency brakes and in this case the pin 22 will slide forward in the slot 39 of the link 37, without there being any action of the control valve or the vacuum power plate and the link 37 remaining stationary. Presuming the emergency brake is in the "off" position as illustrated in Fig. 1, then the usual control of a vehicle is by the foot pedal and service brakes and as above mentioned, in this control the emergency valve is not influenced in any manner. Should the service brakes be inoperative and allow the foot treadle to approach or touch the floor boards, the treadle itself engages the upper end of the valve stem and operates the valve by depressing the valve plug 45. This gives a connection to the source of vacuum through the pipes 30, the valve and the pipe 29 so that the vacuum power comes into operation. The external air forces the piston 33 into the vacuum cylinder 32 and thus through the bell crank 35 and exerting a tension on the link 37 which link through its slotted connection 39 in the pin 22 applies the emergency brakes.

With my construction of the valve stem 42 extending through the floor boards, the operator may readily test the air control system by placing his foot on the button 44 depressing the valve stem 42 and this without any manipulation of the foot brake lever or the emergency hand brake lever. Therefore the operator may at all times ascertain if his emergency control of the vehicle is in operating order. The opening of the valve connection to the source of vacuum shuts off the internal connection to the atmosphere and thus gives full influence to the action of the power assembly 31.

The compressed air arrangement for controlling the emergency application of brakes is as follows, having reference particularly to Fig. 5: In this case an air pressure tank 62 is illustrated as mounted in any suitable manner and has a filler stem 63 through which the tank may be charged with air at high pressure, having a gauge 64 to tell such pressure. The valve assembly 65 has a pipe 66 connecting to the storage tank and a pipe 67 leading to the power cylinder 68. This cylinder is illustrated as having a cylindrical construction 69 with a closure plug 70 having a ball socket with a ball 71 fitting therein and retained by a nut 72. The ball is mounted on a bracket 73 illustrated as attached to a fixed part of the vehicle, such as a flange of the clutch casing. A piston 74 is mounted in the cylinder, there being a compression spring 75 acting on the piston and also there is a relief valve 76 having a duct 77 leading to the cylinder. This duct is closed by a screw operated needle 78 so that the air duct 79 leading to atmosphere may be opened or closed. The piston is connected to a piston rod 80, which in effect forms a link connecting by the slotted connection to the pin 22. This rod or link has a resilient connection 81 therein, similar to the resilient connection 38 of Figs. 1 and 4.

The valve 65 employs a valve casing 82 having the stem 83 slidable therein. This stem has a button or head 84 and the stem projects upwardly through the floor boards of the vehicle, the head of the stem being positioned to be engaged by the treadle part of the foot pedal. The stem has a valve plug 85 closing the valve seat 86; the lower end of the stem 87 operating the guide socket 88. A duct 89 in the form of a groove leads from the interior of the valve adjacent the stem to a second valve seat 90. This is closed by a conical valve plug 91 mounted on the stem. A cover cap 92 encloses the upper plug 91. The duct 89 is on the side of the valve leading to the pipe 67 connected to the power cylinder; the other side of the valve being connected by the pipe 66 to the storage tank.

A spring 93 is used to seat the valve 85 should the air pressure drop. The pressure in the tank 62 holds the valve closed under normal conditions.

In the operation of the device of Fig. 5 having the valve shown in Fig. 7, when the valve treadle is depressed and the service brakes are inoperative, allowing the treadle to engage with the head of the valve stem 83, this stem is depressed, opening the connection through the seat 86 so that there is a direct connection from the storage tank to the cylinder 69. At the same time the valve plug 91 closes on the seat 90 and prevents flow of air through the duct 89. This action causes the application of the emergency brake in the same manner as with the vacuum construction, except that the direct compressed air is the motive fluid. When the pedal is released and the valve closed, there is an atmospheric connection through the cap 92, the duct 89, the pipe 67 to the cylinder 69.

In order to prevent too quick an application of the brakes by the power of the cylinder, I may adjust the needle valve 76 so that there will be a slow passage of air, that is a slow escape of air when the brakes are applied through the air pressure system. This also allows air to flow in the cylinder when the brakes are released. In addition the spring 75 may be utilized or omitted, its utilization helping to retard the movement of the piston and thus decrease the rapidity of the application of the brakes.

In Fig. 9 I illustrate enlarged, the cylinder for the vacuum system of Fig. 1. On the base 95 of the cylinder I utilize a dash pot construction 96. This has a small cylinder 97 with a head 98 screw threaded in the open end and is provided with a piston 99 connected to a stem 100 which operates through the head 95 of the cylinder 32, there being a packing 101 with a suitable packing gland to prevent leakage into the dash pot. The dash pot is provided with a free air inlet 102 adjacent the base 95 and with a needle valve 103. This needle valve has a stem 104, a port 105 leading to the interior of the dash pot and an exhaust port 106 discharging therefrom and controlled by the stem of the needle. By regulating the relief for the stem the action of the vacuum is retarded, thus preventing too quick an application of the brakes.

From the above mentioned description, together with the drawings, it will be seen that I have developed effective appliances which may be connected and mounted in automobiles now in use or may be built into vehicles in the factory. This gives a positive application of the emergency or parking brakes, should the service brakes fail to operate and moreover, allows the driver to test the emergency application by operating the valve with his foot. However in a dangerous situation, if the service brakes fail to operate, the driver does not have to reach for the emergency brake lever or to remove his foot from the ordinary brake pedal, but the continued movement of the latter pedal controls the operation of the emergency brakes. Besides developing an apparatus for applying brakes, it will therefore be seen that I have developed a method of automatically applying emergency brakes on the failure of the service brakes and in which the driver can periodically test the emergency air controlled device.

Various changes may be made in the principles of my invention without departing from the spirit thereof as set forth in the description, drawings and claims.

I claim:

1. In a device as described, a control means to apply service brakes, emergency or parking brakes, and a fluid operated control device actuated by the said means to apply the emergency brakes.

2. In a device as described, a control lever connected to operate service brakes, emergency brakes, a fluid control device positioned to be engaged by the said lever, and means actuated by a power fluid to apply the emergency brakes.

3. In a device as described, a foot operated pedal connected to operate service brakes, emergency brakes, a fluid control device positioned to be actuated directly by the foot pedal in its movement should the service brakes fail to operate or to be operated directly by the operator's foot, and fluid operated means controlled by the control device to apply the emergency brakes.

4. In a device as described, a pivotally mounted foot operated pedal connected to operate service brakes, emergency brakes, a hand lever connected to operate emergency brakes, a control device positioned to be actuated directly by the pedal or to be actuated by the operator's foot, means controlled by the control device to apply the emergency brakes, the application of the emergency brakes either by the hand lever connected thereto or through the control device being independent one of the other.

5. In a device as described, a foot operated pedal connected to operate service brakes, emergency brakes, a valve having a control element positioned to be directly operated by the pedal or by the foot of the operator, a fluid operated device connected to the emergency brakes, a connection from the valve to a source of power and to the device, whereby on actuation of the valve the emergency brakes may be applied.

6. In a device as described, the combination of a vehicle structure having a floor board, a foot operated pedal passing partly therethrough and connected to operate service brakes, a valve having a control element positioned above the floor to be directly operated by the said pedal or by the foot of the operator, a connection from the valve to a source of power, a second connection from the valve to a fluid operative motive device, a connection from the said motive device to emergency brakes, whereby on actuation of the foot pedal and on failure of the service brakes, the emergency brakes may be actuated.

7. In a device as claimed in claim 6, a hand lever with a connection to operate the emergency brakes, the connection of the hand lever and the motive device to the emergency brakes allowing actuation of the emergency brakes by either the hand lever or the motive device, one independent of the other.

8. In a device as described, the combination of a vehicle structure having a floor board, a foot operated pedal passing partly therethrough and connected to operate service brakes, a valve positioned below the floor board and having a control element extending above the floor, to be directly operated by the pedal or by the foot of the operator, a first connection from the valve to a source of air power, a second connection from the valve to an air operative motive device, a connection from said motive device to emergency brakes, whereby on actuation of the foot pedal and on failure of the service brakes, the emergency brakes may be actuated, or said emergency brakes may be actuated directly by the operator's foot engaging said control element, and means in the valve to make a connection between the motive device and atmosphere on the release of the said control element.

9. In a device as described, the combination of a vehicle structure having a floor, a foot operated pedal passing partly therethrough and connected to operate service brakes, a valve having a valve stem extending above the floor and positioned to be engaged by the pedal should the service brakes fail to operate or to be engaged directly by the foot of the operator, a first connection from the valve to a source of air power, a second connection from the valve to a power device having a cylinder and a moving piston therein, a link having a connection from the piston to emergency brakes, the depression of the stem operating the valve and allowing a passage of air between the cylinder and the source of supply, causing the piston to exert a tension on the said link and the link to actuate the emergency brakes.

10. In a device as described, a foot operated pedal connected to operate service brakes, a valve having a control element positioned to be operated directly by the said pedal or directly by the foot of an operator, a connection from the valve to a vacuum creating device, a second connection from the valve to an air operative motive device, a connection from said motive device to emergency brakes, whereby on actuation of the pedal and on failure of the service brakes, the movement of the control element makes a connection from the motive device to the vacuum device and causes the application of the emergency brakes, the movement of the control element directly by the operator's foot also causing an application of the emergency brakes.

11. In a device as described, a foot operated pedal connected to operate service brakes, a valve having a control element positioned to be engaged directly by the pedal or by the foot of an operator, a first connection from the valve to a source of air under pressure, a second connection from the valve to an air operative motive device, a connection from said device to emergency brakes, the actuation of the control element either by the pedal or the foot of the operator making an air connection from the motive device to the source of air pressure and applying the emergency brake.

12. In a device as described, the combination of a vehicle, a foot operated pedal connected to operate service brakes, a valve having a stem positioned to be engaged by the said pedal should the service brakes fail to operate, a connection from the valve to a source of fluid power, a connection from the valve to a cylinder construction, having a moving piston therein, a link connection from the piston to emergency brakes, a connection by a hand lever to the emergency brakes, said connections being independently operable, and a cushioning means in the cylinder to limit the rate of action in applying the brakes through control of the valve.

13. In a device as described in claim 12, the cushioning means comprising a valve in the cylinder having an outlet to atmosphere and means to regulate said outlet, whereby on movement of the piston the rate of outflow of air from the cylinder may be regulated.

14. In the art described, a method of applying emergency brakes, comprising controlling a vehicle by service brakes through the operation of the foot of the driver and on the failure of the service brakes the action of the driver's foot controlling a power fluid and such power fluid applying the emergency brakes and as an alternative the operator by the action of the hand applying the emergency brakes, the action by the hand and by the foot being independent one of the other.

15. In the art described, a method of applying emergency brakes, comprising applying service brakes by the movement of the foot of an operator, on the failure of the service brakes the movement of the operator's foot controlling a power fluid, such power fluid being controlled independently of the movement to apply the service brakes, and such power fluid applying the emergency brakes.

16. In the art described, the method of applying emergency brakes comprising applying service brakes by the movement in a rectilinear direction of the foot of an operator, the movement past a position to apply the service brakes on the failure of such brakes controlling a power fluid, such power fluid being controlled if desired by the foot of the operator independently of the application of the service brakes, the power fluid when controlled applying the emergency brakes as an alternative to the movement of the hand of the operator applying the emergency brakes, the application of the emergency brakes by the hand or by the foot being independent one of the other.

In testimony whereof I have signed my name to this specification.

WLADIMIRE J. OBIDINE.